Sept. 4, 1951      L. R. WOTTRING      2,567,003
VISION PLOTTING DEVICE

Filed Nov. 17, 1949      2 Sheets-Sheet 1

INVENTOR.
LEE R. WOTTRING,
BY James M. Abbott
ATTORNEY.

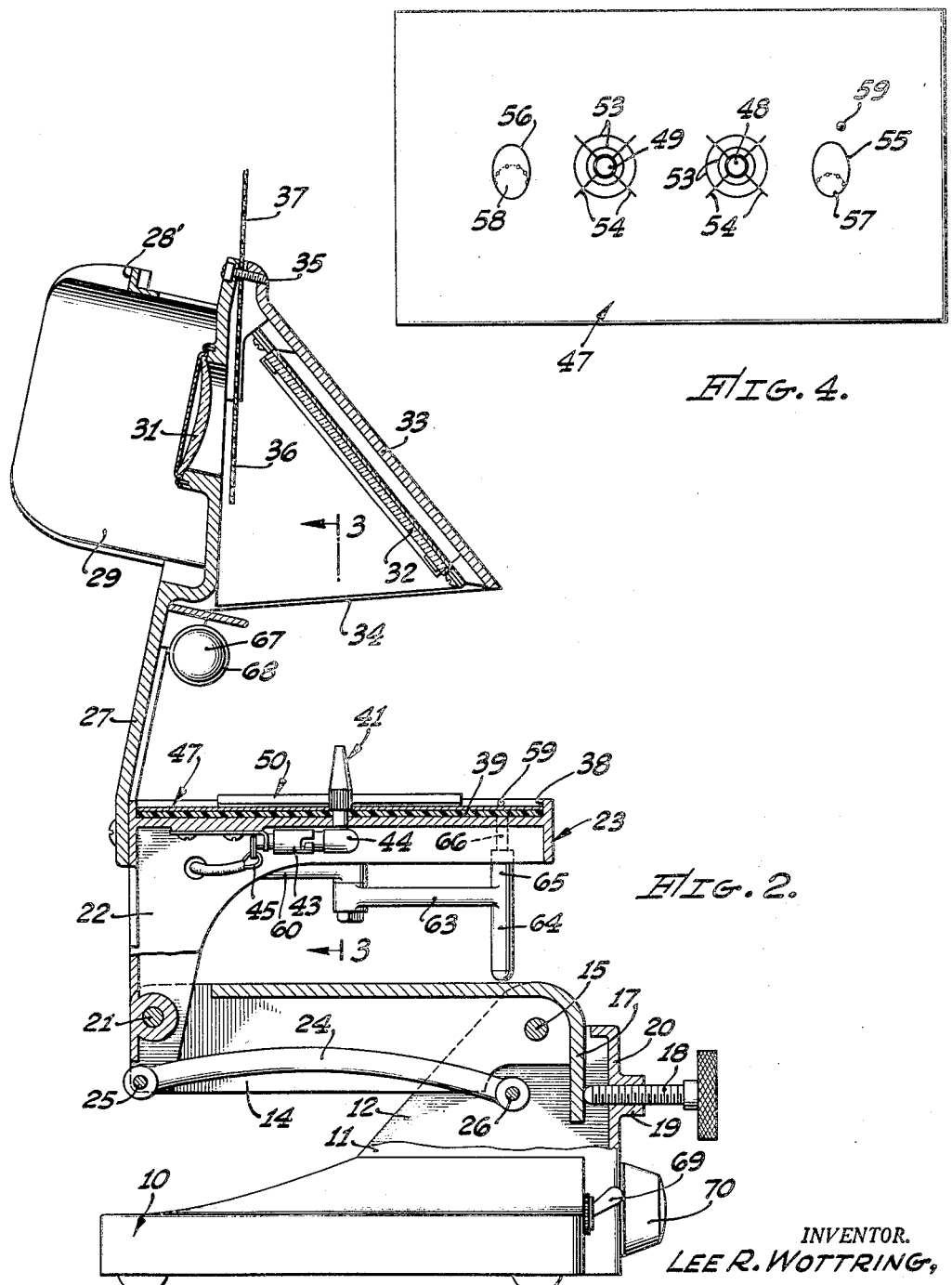

Patented Sept. 4, 1951

2,567,003

UNITED STATES PATENT OFFICE 2,567,003

VISION PLOTTING DEVICE

Lee R. Wottring, Altadena, Calif.

Application November 17, 1949, Serial No. 127,863

6 Claims. (Cl. 88—20)

1

This invention relates to a plotting device.

In various types of plotting an image is projected upon a plotting sheet and a member is moved over the sheet so the plotting operation can be performed. This is used especially in optical research work in which it is desirable to plot the blind spot of Mariotte. In fact, medical authorities have noted that when a source of infection in the patient's body, such as tonsils, teeth, sinus, ethmoid, and ethmoid cavities, has been corrected the visual activity of the eye is restored and the blind spot in the eye assumes substantially its normal area. It has also been found that it is possible to chart the total visual field of an eye as well as the color field. Heretofore, in plotting the aforementioned fields various structures have been used which are mobile in character, but these devices have obscured the vision and have detracted the attention of the patient so that it has not been possible to obtain an accurate plot of the area desired. It is the principal object of the present invention to provide means whereby plotting charts may be supported and the true visual axis of the patient may be projected toward the chart and held in its center position, the structure also carrying simple mobile means which may be moved over the chart without obscuring the vision, and will make it possible for the technician to cooperate readily with the patient in plotting the field desired.

The present invention contemplates the provision of a plotting table carrying vision centering elements, and being provided with a mobile target which moves over the plotting surface and which is controlled by the technician without such control being visible by the patient.

The invention is illustrated by way of example in the accompanying drawing in which:

Fig. 2 is an enlarged fragmentary view as seen on the line 2—2 of Fig. 1 and shows the details of construction of the device.

Fig. 4 is a view in plan showing one of the sheets used in plotting the blind spot of a patient's eye.

Figure 1:
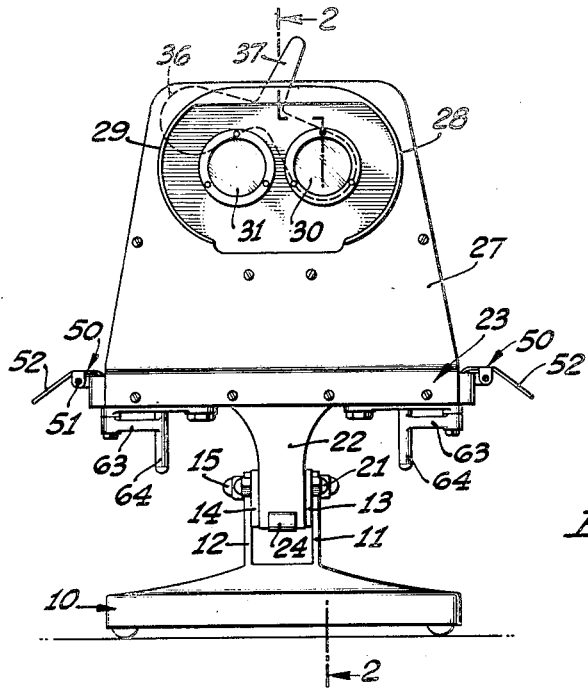
Figure 1 is a view in elevation showing the plotting instrument in which the present invention is concerned.

Referring more particularly to the drawing, 10 indicates a base structure fitted with vertically extending brackets 11 and 12. These brackets are pivoted to arms 13 and 14 by a pivot bolt 15. As shown in Fig. 2 of the drawing the arms extend horizontally and are of substantially channel section. The arms are formed integral by a web 16, and the forward ends of this web extend downwardly at 17. The web is borne against by an adjusting screw 18 which is carried in a boss 19 of a web 20. The web 20 connects the brackets 11 and 12. By adjustment of the screw 18 it will be obvious the arms 13 and 14 may be swung vertically upon the pivots 15, for a purpose to be hereinafter described. At the free end of the arms 13 and 14 is a pivot bolt 21. This bolt connects the arms with a bracket 22 which extends downwardly from a plotting table 23. The plotting table is designed to remain horizontal and in order to maintain it in its horizontal position a link 24 is connected by a pin 25 at the lower end of the bracket 22 and by a pin 26 to the members 11 and 12. Carried by the plotting table 23 is an upright 27. At its upper end arcuate light shields 28 and 29 are carried and form a cavity within which object lenses 30 and 31 are mounted. The optical axes of these lenses extend forwardly to strike an inclined reflector 32 carried by a supporting shield 33. The supporting shield 33 is formed integral with the upright 27 and has side wall portions 34. Pivotally mounted at the upper end of the upright 27 by a screw 35 is a shutter 36 formed with a handle 37. This shutter may be manipulated by the handle 37 so that either of the object lenses 30 or 31 may be covered, thus making it possible to examine one eye of a patient at a time. The optical axes of the lenses 30 and 31 are so arranged with relation to the inclined reflector 32 that the patient may view the upper surface of the plotting table 23. The plotting table is preferably formed with a rectangular recess 38 which receives a sheet of nonmetallic material 39. For present purposes this material may be Bakelite. Extending upwardly through the Bakelite sheet in spaced relation to each other are illuminating pins 40 and 41. These pins are spaced a distance from each other agreeing substantially with the optical centers of the two eyes of a patient being examined. The pins are tubular and have a center opening 42 through each one of them. At the lower end of each pin is mounted a socket 43 which carries a small neon tube 44. This tube is attached with a source of electricity by conductors 45 and 46. It is preferable that the tubes shall be orange in color and that they will project an orange colored light upwardly through the passageways 42 in the two pins 40 and 41, and are used as a focal center for either of the patient's eyes being tested.

Referring more particularly to Fig. 4 of the drawing, a plotting sheet 47 is shown. This is provided with perforations 48 and 49 through which the pins 40 and 41 extend. These pins are preferably tapered. This facilitates placing the plotting sheet in position and also reduces the focal point so that the patient being tested only views approximately the illuminated orange spot at the end of the pin. At the opposite ends of the plotting table 23 are clamping fingers 50 which overhang the ends of the table and engage the plotting sheet 47. They are pivoted to the table at 51 and may be lifted by depressing extensions 52.

Referring again to Fig. 4, it will be seen that a plurality of concentric circles 53 are marked on the paper and are made to be concentric with the openings 48 and 49. These circles are subdivided by radial lines 54 for the purpose of optical examination. At the outer sides of the sheet or plotting paper are elliptical markings 55 and 56. The ellipses 55 and 56 represent the normal pattern of the blind spot occurring in the right and left pupil of the patient's eyes.

Figure 3:
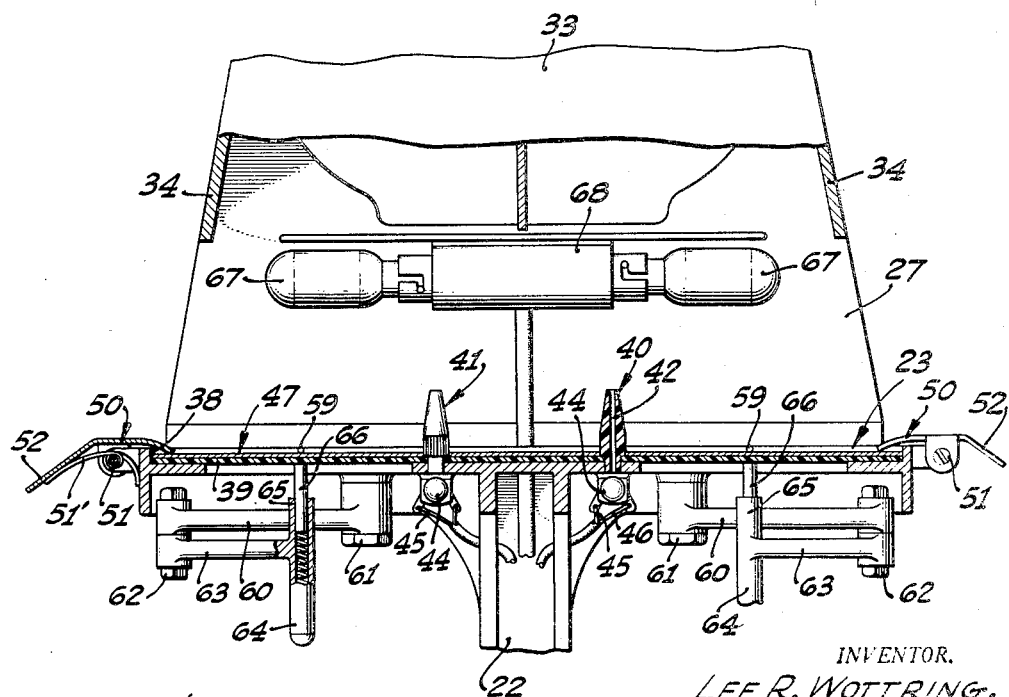
Fig. 3 is an enlarged view in vertical section on the line 3—3 of Fig. 2 showing the plotting table, illuminating means, and the means whereby the mobile target is moved.

In order to plot the actual diminished blind spot in a patient's eye, such as indicated at 57 and 58, a movable target 59 is provided, which is preferably a steel ball provided to roll freely over the plotting sheet 47. The ball is used in testing either eye and is moved due to magnetic attraction. This attraction is controlled by duplicate structures at opposite sides of the center line of the table and disposed therebeneath. The structures, as shown in Fig. 3 of the drawing, comprise a link 60 which is pivoted to the underside of the plotting table 23 by a pivot bolt 61. The outer free ends of the link are provided with pivot bolts 62 by which a link 63 is pivoted to the link 60. The link 63 is substantially T-shaped and has a handle portion 64 which extends downwardly and a tubular portion 65 which extends upwardly. The tubular portion has a central bore to receive a magnet 66 having a permanent field. The upper end of the magnet 66 bears against or is in close proximity to the lower face of the Bakelite sheet 39. Thus, since the Bakelite sheet is non-metallic the magnetic field from the permanent magnet 66 may pass through the sheet, and when the target 59 is included in the field it is obvious that the target will move around and over the surface of the plotting sheet when the magnet is moved. By this arrangement it is possible to move the target in and out of the range of vision of the patient, and also makes it possible to move the target within the ellipse representing the normal blind spot of the patient's eye so that a mark may be made on the plotting sheet 47 to plot the actual blind spot by a technique to be hereinafter described.

In order to properly illuminate the plotting sheet 47 electric bulbs 67 are mounted in a socket 68 carried by the upright 27 and included within an electric circuit controlled by a switch 69. It is to be pointed out that the electric circuits including conductors 45 and 46 may be controlled as to volume by a knob 70 which operates a rheostat not shown in the drawing.

In operation of the present invention, a plotting sheet 47 has been previously prepared having the ellipses 55 and 56 mounted or printed upon it, as well as concentric circles 53 and the dividing lines 54. The perforations 48 and 49 have been made through the sheet and the plotting sheet is positioned over the pins 40 and 41 so that the sheet will lie flat upon the Bakelite member 39. The clamping fingers 50 are raised by pressing the extensions 52 against springs 51' which tend to hold the fingers 50 in their lowermost positions. The target ball 59 is then placed upon the plotting sheet and the permanent magnet 66 on the side of the sheet to be plotted is then moved until the ball is within the influence of the magnetic field of the magnet 66. The patient places his forehead against a rest 28' and looks through the lenses 30 and 31 so that a beam of light from the plotting sheet will be observed upon the inclined reflector 32. The screw 18 is adjusted so that the member 14 will swing upwardly or downwardly and thus raise or lower the upright 27. It will be understood that during this raising or lowering operation the plotting table 23 will be maintained horizontally and an adjustment can be made so that the patient can look conveniently through the eye-pieces comprising the object lenses 30 and 31. The technician grasps the appropriate handle 64 and swings the permanent magnet 66 beneath the plotting table 23. The field of this magnet influences the target 59 so that it can be moved universally over the plotting sheet. The patient is instructed to focus the eye being tested directly upon the illuminated opening 42 of one of the pins 40 or 41, and at this time the shutter 36 is swung so that the vision of the other eye will be obstructed. The switch 69 is closed so that illuminating bulbs 67 will be supplied with current to properly illuminate the surface of the plotting sheet, and the rheostat knob 70 is adjusted to control the intensity of the lamps 67 which illuminate the chart. When the eye is focused on the illuminated point the plotted ellipse representing the normal blind spot, is indicated at 55 or 56, is within the field of vision. The target is manipulated over the surface of the plotting sheet 47 and the patient advises the technician at any point when the target becomes invisible. This point is marked on the plotting sheet, as indicated at 57 or 58, and when the actual blind spots are thus plotted they may be compared in area with the area of the normal blind spots represented by the ellipses 55 and 56. The relative decrease in area of the actually plotted blind spot and the normally indicated blind spot will give the technician information from which he may deduct the degree of infection above the shoulders of the patient. After these deductions have been made the patient may be referred to specialists who will carry on further exploratory examinations in an effort to locate the source of infection and to eliminate it. It has been found in actual practice that after this has been done further plotting of the blind spots may be made and it will be demonstrated that the actual blind spot has increased to its normal size.

It is also to be pointed out that while the present structure may be used for plotting blind spots it may also be used as a campimeter to ascertain the acuteness of vision and the capability of the eye to see fields of different color. This test may be accomplished by using colored targets.

It will thus be seen that the instrument here disclosed provides simple means that may be easily adjusted to a patient for plotting the blind spot in a patient's eye, and that the target may be readily moved by menas not visible to the patient, thereby insuring that the eye will remain in proper focus, and that the blind spot of the eye may be easily plotted and compared with a normal blind spot by simple and effective means.

While I have shown the preferred form of my invention as now known to me, it will be understood that various changes may be made in combination, construction and arrangement of parts by those skilled in the art, without departing from the spirit of the invention as claimed.

Having thus described my invention, what I claim and desire to secure by Letters Patent is:

1. In an optical instrument, the combination of: a horizontal plotting table; a pair of tubular centering pins mounted in vertical spaced relation on said table and extending above said table; a plotting sheet having openings to receive said pins and resting when in use on said table; means for projecting beams of light upwardly through said pins, said pins being spaced approximately the average distance between human optical centers; an upright wall provided on said table along one edge thereof; two eye windows provided in said wall in vertical planes normal to said wall and containing the axes of said pins; a shutter for optionally closing one or the other of said windows; a hood mounted on said wall and overlying said table; a plain mirror mounted within said hood to deflect said beams through said windows and give an observer looking through said windows a plan view of said sheet; and means for providing a movable marker on said sheet for plotting on said sheet an area of retinal response.

2. A combination as in claim 1 in which said table is non-magnetic in character and in which said marker contains magnetic material; a magnet mounted for universal movement beneath said table to control the position of said marker on said sheet from beneath the table; and a lamp on the inside of said wall and shaded from said mirror for illuminating said sheet and said markers.

3. In an optical instrument, the combination of: a horizontal plotting table; a pair of tubular centering pins mounted in vertical spaced relation on said table; a plotting sheet having openings through which the axes of said pins pass and which is adapted to rest when in use on said table; means for projecting beams of light upwardly through said pins, said pins being spaced approximately the average distance between human optical centers; a view piece supported on said table and overlying the same, said view piece including an upright wall having individual eye windows provided therein, in vertical planes normal to said wall and containing the axes of said pins, said eye piece also including a plain mirror mounted therewith and overlying said table to deflect said beams through said windows and give an observer looking through said windows a plan view of said sheet and means for providing a movable marker on said sheet for plotting on said sheet an area of retinal response.

4. A combination as in claim 3 in which said instrument includes a base; parallelogram linkage connecting said base with said table; and means for actuating said linkage to raise or lower said table and said view piece with respect to said base to accommodate said view piece to the line of vision of the patient.

5. A combination as in claim 3 in which said eye piece includes a hood overlying said table and providing the mounting for said mirror, there being an adequate vertical spacing between the lower edge of said hood and said table to expose said sheet to the view of an operator employing said instrument in running a test.

6. A combination as in claim 3 in which said table is non-magnetic in character and in which said marker contains magnetic material; a primary arm pivotally mounted on a vertical axis on said table and lying therebeneath; a secondary arm pivotally mounted on a vertical axis on said primary arm; and a magnet slidably mounted on a vertical axis on the free end of said secondary arm for free universal movement beneath said table to control the position of said marker on said sheet from beneath said table.

LEE R. WOTTRING.

REFERENCES CITED

The following references are of record in the file of this patent:

UNITED STATES PATENTS

| Number | Name | Date |
|---|---|---|
| 1,543,188 | Poser | June 23, 1925 |
| 2,263,971 | King | Nov. 25, 1941 |
| 2,441,031 | Papritz | May 4, 1948 |
| 2,482,669 | Harding | Sept. 20, 1949 |

FOREIGN PATENTS

| Number | Country | Date |
|---|---|---|
| 113,641 | Great Britain | Feb. 25, 1918 |